(12) United States Patent
Karg et al.

(10) Patent No.: US 8,887,454 B2
(45) Date of Patent: Nov. 18, 2014

(54) SOLAR MODULE ATTACHMENT DEVICE AND MOUNTING METHOD

(75) Inventors: Franz Karg, Munich (DE); Hans-Werner Kuster, Aachen (DE); Jaap Van Der Burgt, Gorssel (NL)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/392,289

(22) PCT Filed: Aug. 25, 2010

(86) PCT No.: PCT/FR2010/051771
§ 371 (c)(1),
(2), (4) Date: Mar. 26, 2012

(87) PCT Pub. No.: WO2011/023902
PCT Pub. Date: Mar. 3, 2011

(65) Prior Publication Data
US 2012/0174968 A1 Jul. 12, 2012

(30) Foreign Application Priority Data
Aug. 25, 2009 (FR) ...................................... 09 55785

(51) Int. Cl.
*F24J 2/02* (2006.01)
*H01L 31/042* (2014.01)
*F24J 2/52* (2006.01)
*F24J 2/46* (2006.01)

(52) U.S. Cl.
CPC ................ *F24J 2/5254* (2013.01); *Y02E 10/47* (2013.01); *H01L 31/0422* (2013.01); *F24J 2002/4692* (2013.01); *F24J 2002/4665* (2013.01); *Y02E 10/50* (2013.01); *F24J 2/5256* (2013.01); *F24J 2/5232* (2013.01); *Y02B 10/12* (2013.01); *Y02B 10/20* (2013.01); *F24J 2002/5281* (2013.01)
USPC .......................................... 52/173.3; 136/251

(58) Field of Classification Search
CPC ......... Y02B 10/12; Y02B 10/20; Y02E 10/47
USPC ........... 52/173.3, 483.1, 489.1; 136/245, 244, 136/251; 126/623, 621
See application file for complete search history.

(56) References Cited

U.S. PATENT DOCUMENTS 3,295,284 A * 1/1967 Tschiesche ................. 52/506.07
5,741,370 A * 4/1998 Hanoka .......................... 136/251

(Continued)

FOREIGN PATENT DOCUMENTS

DE 3423227 A1 * 1/1986 ................. F24J 2/52
DE 10017502 A1 10/2001

(Continued)

OTHER PUBLICATIONS

International Search Report as issued for International Patent Application No. PCT/FR2010/051771, dated Nov. 4, 2011.

*Primary Examiner* — Christine T Cajilig
(74) *Attorney, Agent, or Firm* — Pillsbury Winthrop Shaw Pittman LLP

(57) ABSTRACT

A device for attaching a module for collecting energy originating from solar radiation on a structure such as a roof, a façade or a mounting structure of a ground-mounted system, in which the module is provided with at least one fastener on its face designed to be facing the structure. The device includes at least one support secured to the structure by snap-fitting, the fastener and the support being suitable for being coupled to one another for the attachment of the module to the structure.

18 Claims, 5 Drawing Sheets

(56) References Cited

U.S. PATENT DOCUMENTS

| | | | |
|---|---|---|---|
| 5,986,203 A * | 11/1999 | Hanoka et al. | 136/251 |
| 6,414,237 B1 * | 7/2002 | Boer | 136/251 |
| 2011/0265861 A1 * | 11/2011 | Nabauer et al. | 136/251 |
| 2012/0312945 A1 * | 12/2012 | McPheeters | 248/228.2 |

FOREIGN PATENT DOCUMENTS

| | | |
|---|---|---|
| DE | 202006018426 U1 | 3/2007 |
| DE | 202007008614 U1 | 8/2007 |
| DE | 202008000997 U1 | 6/2008 |
| DE | 202008015017 U1 | 2/2009 |
| DE | 202008015237 U1 | 3/2009 |
| DE | 102008006106 A1 | 7/2009 |
| EP | 1 496 550 A2 | 1/2005 |
| EP | 1 947 402 A1 | 7/2008 |
| WO | WO 00/12839 A1 | 3/2000 |
| WO | WO 2006/101392 A2 | 9/2006 |
| WO | WO 2009/015106 A2 | 1/2009 |

* cited by examiner

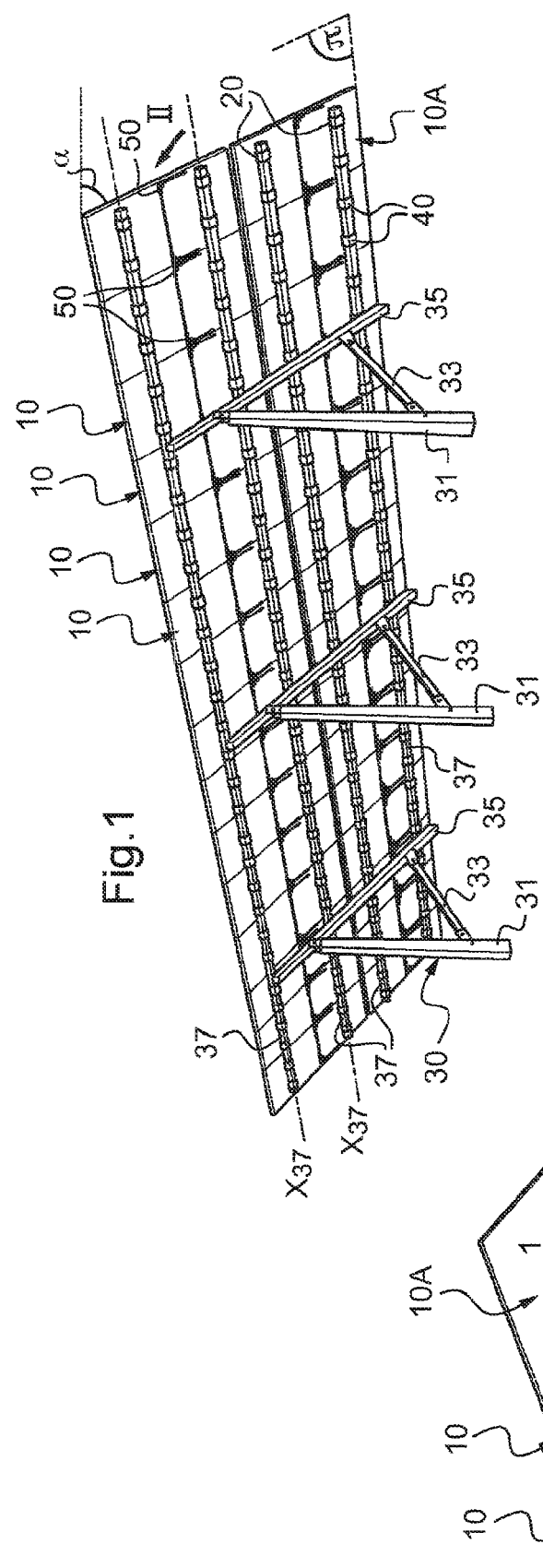
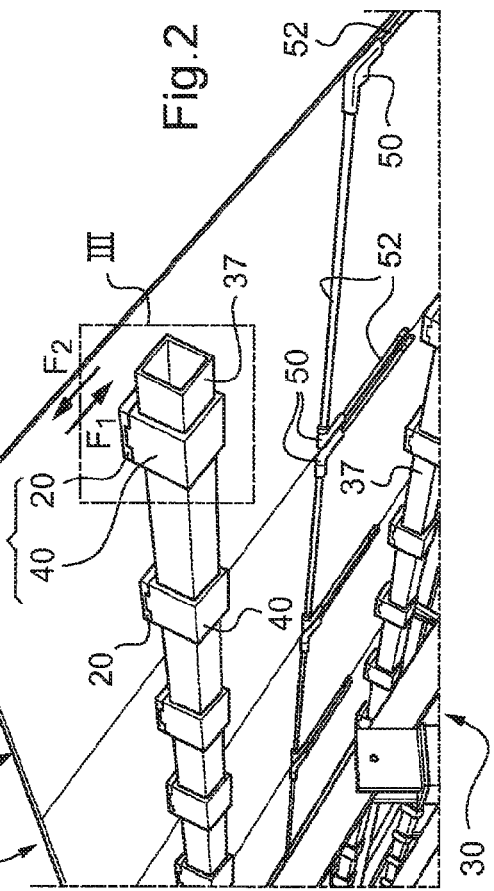

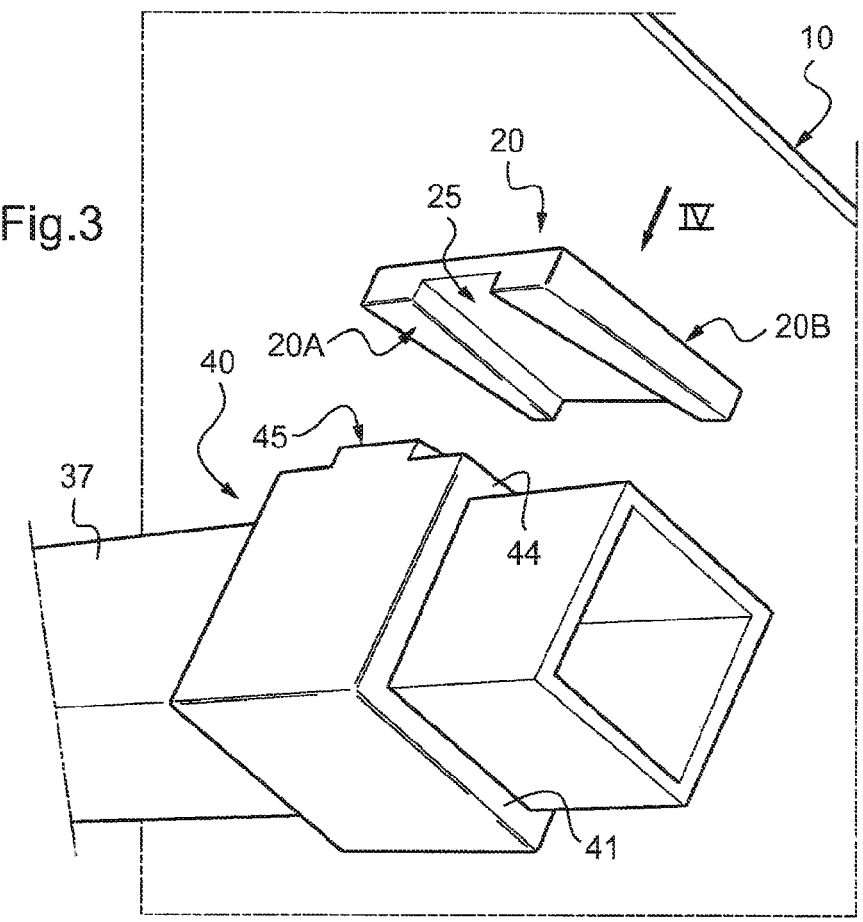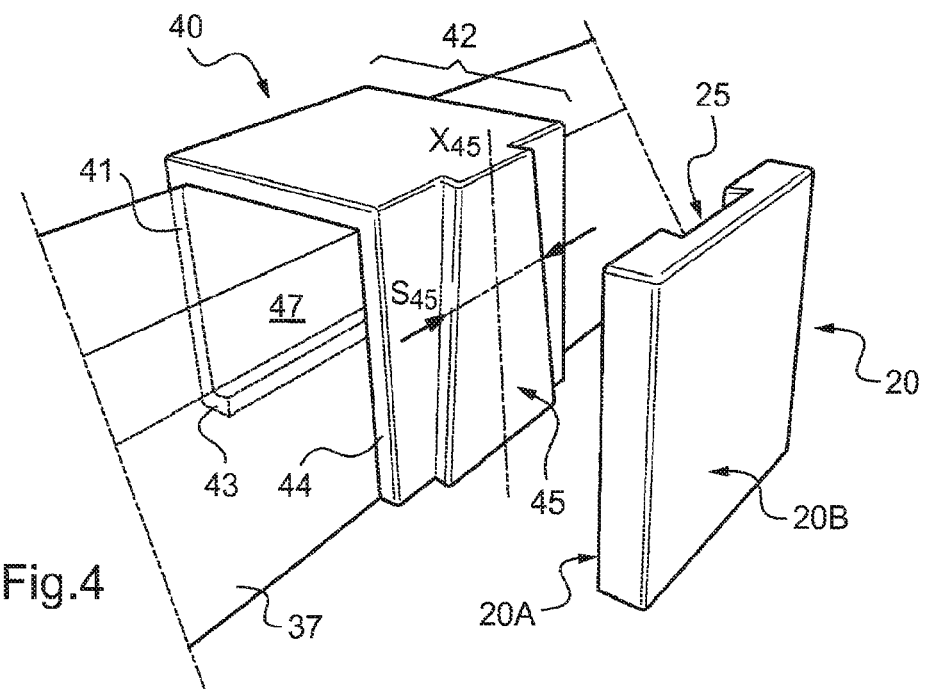

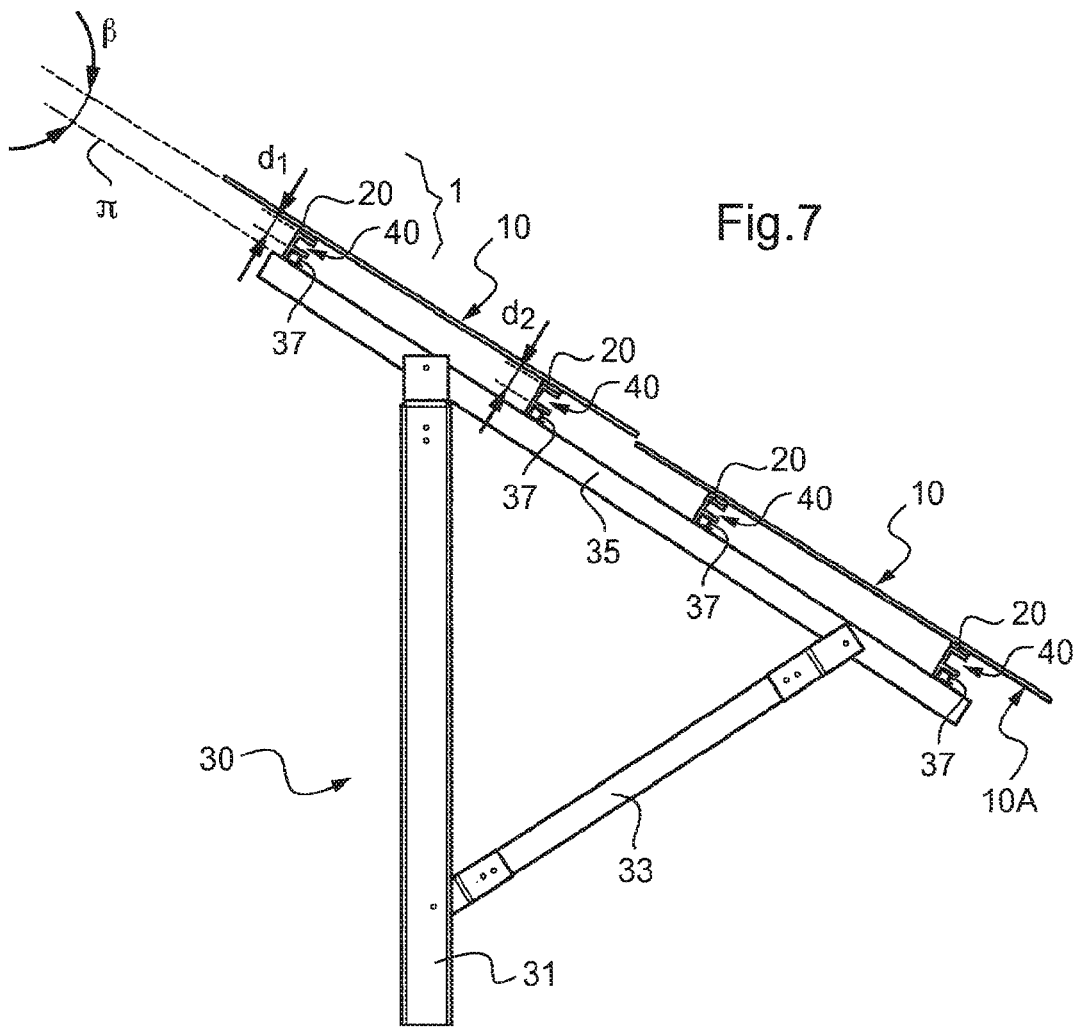

SOLAR MODULE ATTACHMENT DEVICE AND MOUNTING METHOD

CROSS-REFERENCE TO RELATED APPLICATIONS

This application is the U.S. National Stage of PCT/FR2010/051771, filed Aug. 25, 2010, which in turn claims priority to French Application No. 0955785, filed Aug. 25, 2009. The content of both applications are incorporated herein by reference in their entirety.

The present invention relates to a device for attaching a module for collecting energy originating from solar radiation to a structure, such as a roof, a façade or a mounting structure of a ground-mounted system, and to a method for mounting at least one module for collecting energy originating from solar radiation on a structure.

Within the meaning of the invention, a module for collecting energy originating from solar radiation may in particular be a photovoltaic solar module, capable of converting the energy originating from solar radiation into electrical energy; a thermal solar module, capable of converting the energy originating from solar radiation into thermal energy collected in a heat transfer fluid; or alternatively, a hybrid solar module using these two types of energy conversion.

In a known manner, a photovoltaic solar module takes the form of a laminated glazing unit comprising photovoltaic cells inserted between a transparent front substrate, designed to be placed on the side of incidence of the solar radiation on the module, and a transparent or opaque rear substrate, designed to be arranged facing a structure for mounting the module. The front and rear substrates may in particular be formed by sheets of glass or of thermoplastic polymer. In order to allow the mounting of the photovoltaic module onto a structure, such as a roof or a building façade, or else a mounting structure of a ground-mounted system, the module is conventionally fitted with a metal frame, particularly made of aluminium, which covers its periphery. The attachment of the module to the mounting structure is then achieved by securing the frame to the structure and/or to the frame of another module, if several juxtaposed modules are mounted.

The frame of each module is generally secured to the mounting structure and, as appropriate, to the frames of adjacent modules, by screwing or bolting. The result of this is a relatively long time for mounting the photovoltaic modules on the structure, as well as a relatively long removal time in the event of a failure of one or more modules. Moreover, the presence of a metal frame on the periphery of each module and the attachment of the module to the structure at this frame cause mechanical stresses to occur on the periphery of the module, which harms the mechanical strength of the module. In addition, the metal frame of each module covers active surface portions on the periphery of the module which, if they were not covered, would participate in the energy conversion, which limits the efficiency of the module.

Similar problems arise with thermal or hybrid photovoltaic/thermal solar modules.

It is these drawbacks that the invention is more particularly intended to remedy by proposing an attachment device allowing the rapid and reliable mounting of solar modules on a receiving structure, without weakening the structure of the modules, and easy replacement of the modules once mounted on a structure, for example in the event of a failure.

To this end, a subject of the invention is a device for attaching at least one module for collecting energy originating from solar radiation on a structure such as a roof, a façade or a mounting structure of a ground-mounted system, in which the module is provided with at least one fastener on its face designed to be facing the structure, the device comprising at least one support secured to the structure, the fastener and the support being suitable for being coupled to one another for the attachment of the module to the structure, characterized in that the support is secured to the structure by snap-fitting.

According to other advantageous features of an attachment device according to the invention, taken in isolation or in all the technically possible combinations:
  the support comprises a snap-fitting portion defining an internal volume for receiving a portion of the structure, the snap-fitting portion being elastically deformable and suitable for gripping the portion of the structure in its internal volume;
  the fastener comprises a profile, as a protrusion or as a recess, suitable for engaging with a matching profile, as a recess or as a protrusion, of the support, the fastener and the support being capable of being coupled to one another by engaging their respective profiles;
  the profiles of the fastener and of the support each have a cross section which diminishes in one direction of the profile, the profiles of the fastener and of the support being capable of coming into mutual engagement by a sliding movement of one to the other in the said direction of the profile;
  the profile of the fastener and the profile of the support have trapezoidal matching shapes;
  the support comprises a first portion for snap-fitting onto the structure and a second portion for coupling relative to a fastener, the first and second portions being at a distance from one another;
  the support comprises means for modulating the distance between the first portion and second portion;
  the device comprises at least two fasteners secured to the face of the module and two supports secured to the structure, the distance between the first portion and second portion of one of the supports being different from the distance between the first portion and second portion of the other support so that, in the configuration in which the module is attached to the structure, the module is inclined at an angle in a mid-plane of attachment of modules to the structure;
  the fastener is made of an electrically insulating material, particularly of a polymer or with a polymer matrix;
  the support is made of an electrically insulating material, particularly of a polymer or with a polymer matrix;
  the device comprises at least two fasteners secured to the face of the module by being evenly distributed over the said face of the module and offset internally relative to the peripheral edges of the module;
  the module is a photovoltaic module with no frame, which comprises a front substrate, a rear substrate and at least one photovoltaic cell inserted between the front substrate and rear substrate, the or each fastener being secured to a face of the rear substrate, the face being opposite to the photovoltaic cell.

A further subject of the invention is a method for mounting at least one module for collecting energy originating from solar radiation on a structure, such as a roof, a façade or a mounting structure of a ground-mounted system, by means of an attachment device as described above, comprising steps in which:
  at least one fastener is secured to the face of the module, the face being designed to be facing the structure;
  at least one support is snap-fitted to the structure;

the module is attached to the structure by coupling the fastener to the support.

If at least one module is mounted on a structure for which the mid-plane for attachment of the module is inclined at an angle relative to the horizontal, the mounting method comprises steps in which:
- at least one fastener is secured to the face of the module, the face being designed to be facing the structure;
- at least one support is snap-fitted to the structure, so that the cross section of its profile diminishes in the direction of the ground;
- the module is attached to the structure by placing the profiles of the fastener and of the support in mutual engagement by a sliding movement downwards, in the direction of the ground, of the fastener relative to the support.

Advantageously, such a mounting method comprises steps in which:
- at least a first and a second fastener is attached to the face of the module, the face being designed to be facing the structure;
- at least one first and one second support are snap-fitted to the structure;
- the first fastener is positioned facing the first support and the position, on the structure, of the second support is adjusted in order to place it facing the second fastener;
- the module is attached to the structure by coupling the first and the second fastener respectively to the first and second support.

The features and advantages of the invention will appear in the following description of two embodiments of an attachment device according to the invention, given solely as an example and made with reference to the appended drawings in which:

FIG. 1 is a figure in perspective of photovoltaic solar modules mounted on a carrying structure by means of attachment devices according to a first embodiment of the invention;

FIG. 2 is a view in perspective on a larger scale in the direction of the arrow II of FIG. 1;

FIG. 3 is a view on a larger scale and exploded of the detail III of FIG. 2;

FIG. 4 is a view in perspective in the direction of the arrow IV of FIG. 3 in which the photovoltaic module has been omitted;

FIG. 7 is a view in elevation of photovoltaic solar modules mounted on a carrying structure by means of attachment devices according to a second embodiment of the invention;

FIG. 8 is a view in perspective on a larger scale of a support of an attachment device of FIG. 7.

Figure 5:
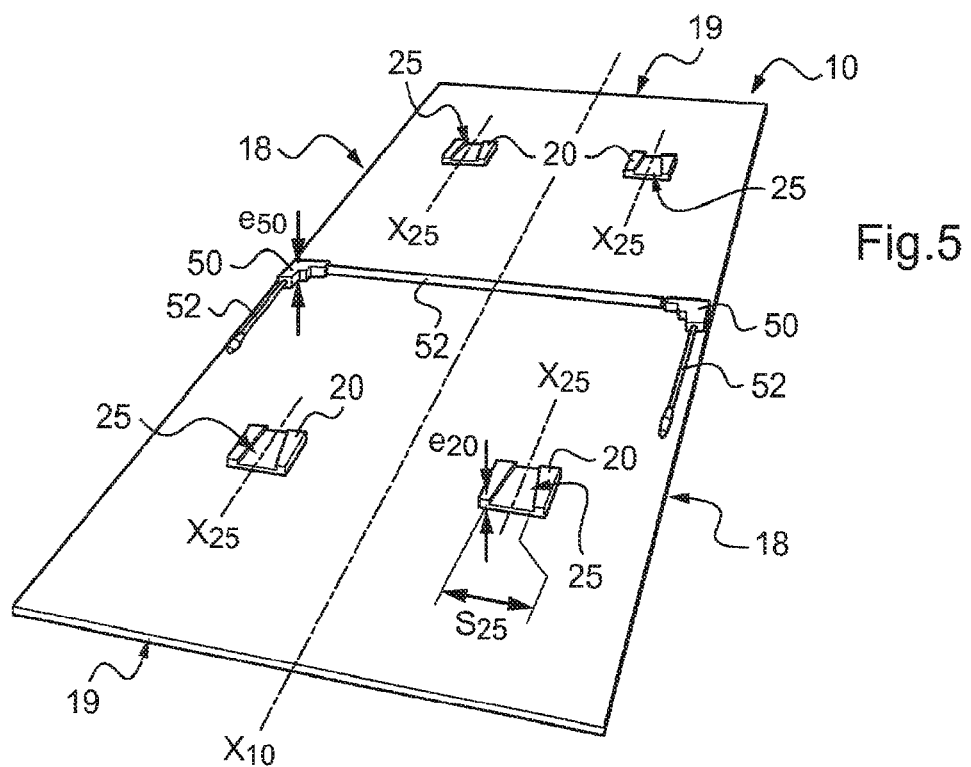
FIG. 5 is a view in perspective from below of a photovoltaic module of FIG. 1 furnished with fasteners of its attachment device.

In the first embodiment shown in FIG. 1, photovoltaic modules 10 are mounted on a carrying structure 30, of the type of mounting structure of a ground-mounted system, by means of attachment devices 1 according to the invention. The structure 30 is suitable for receiving the modules 10 with an inclination relative to the horizontal, designed to maximize the incident solar radiation on the module. Marked $\pi$ is the mid-plane for attaching the modules 10 to the structure 30, which is inclined at an angle $\alpha$ relative to the horizontal. As shown in FIG. 1, the angle $\alpha$ of inclination of the mid-plane $\pi$ relative to the horizontal is of the order of 45°. More generally, the angle $\alpha$ may be between 0° and 90°, preferably between 10° and 90°.

The structure 30 is a stainless steel structure comprising a plurality of joints 31, 33, 35 arranged together so as to form a triangulate framework, on which cross members 37 with quadrilateral cross section are attached. The cross members 37, a longitudinal axis of which is marked $X_{37}$, are parallel with one another and designed to receive a plurality of juxtaposed photovoltaic modules 10, each photovoltaic module 10 being mounted on the structure 30 by means of the attachment device 1. This attachment device 1 comprises, for each module 10, four fasteners 20 secured to the module and four supports 40 secured to the structure.

Figure 6:
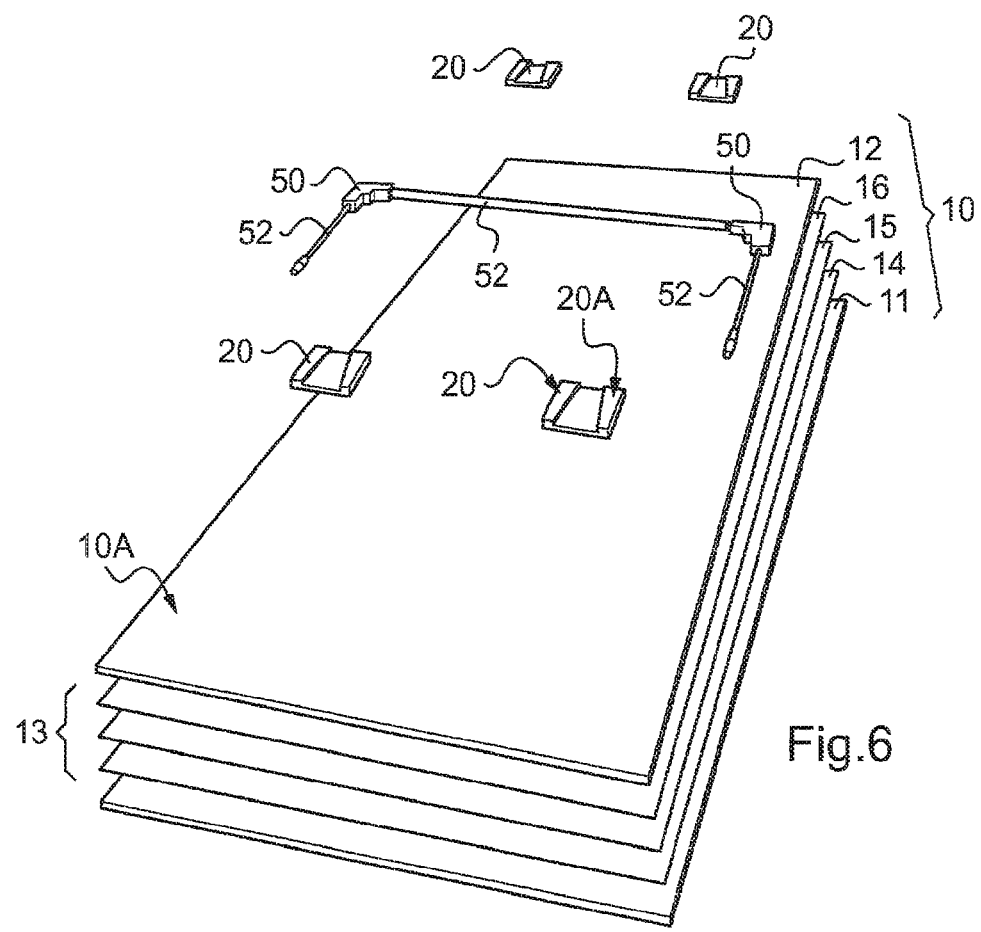
FIG. 6 is a view similar to FIG. 5, but in exploded perspective.

As shown in FIGS. 5 and 6, each module 10 is a parallelepipedal photovoltaic module with no frame, which comprises a front substrate 11, a rear substrate and one or more photovoltaic cells 13 inserted between the front substrate 11 and rear substrate 12. The front substrate 11, designed to be arranged on the side of incidence of the solar radiation on the module 10, is transparent, for example made of an extra-clear transparent glass or of a transparent thermoplastic polymer such as polycarbonate, polyurethane or polymethyl methacrylate. The rear substrate 12, designed to be arranged facing the structure 30, is made of any appropriate material which may or may not be transparent.

The or each photovoltaic cell 13 positioned between the substrates 11 and 12 is formed by a stacking of thin layers comprising successively, from the front substrate 11, an electrically conductive transparent layer 14, particularly based on transparent conductive oxide or TCO, which forms a front electrode of the cell; a layer 15 of absorber, suitable for converting the energy originating from the incident solar radiation on the cell into electrical energy, particularly a thin, amorphous or microcrystalline silicon-based layer or a cadmium telluride-based layer; and an electrically conductive layer 16 which forms a rear electrode of the cell.

As a variant, the layer 15 of absorber of the or each cell 13 may be a thin layer of chalcopyrite compound comprising copper, indium and selenium, called a CIS absorber layer, optionally with added gallium (CIGS absorber layer), aluminium or sulphur. In this case, the or each thin-layered cell 13 comprises a stack similar to that described above, a polymer laminate insert not shown also being positioned between the front electrode 14 of the cell and the front substrate 11, in order to ensure good cohesion of the module 10 when it is assembled. The laminate insert may in particular be made of a polyvinyl butyral (PVB) or of ethylene vinyl acetate (EVA).

According to yet another variant, the or each cell 13 may be made from "wafers" of polycrystalline or monocrystalline silicon forming a p/n joint.

Each module 10 is fitted with two connection boxes 50, secured to the face 10A of the module designed to be facing the structure 30, which is the face of the rear substrate 12 opposite to the or each photovoltaic cell 13. The connection boxes 50 are secured to the face 10A of the module by any appropriate means, particularly by bonding, and are positioned symmetrically with one another relative to a longitudinal mid-line $X_{10}$ of the module, in a mid-portion of the module relative to the direction of the axis $X_{10}$. The connection boxes 50 are connected together and to the outside by means of cables 52, which allows the module 10 to be electrically connected, once mounted on the structure 30, to adjacent modules 10 and to devices not shown for providing electric current.

As can be clearly seen in FIG. 5, each module 10 is furnished with four fasteners 20 secured to the face 10A of the module by bonding by means of an adhesive material. The four fasteners 20 are identical to one another and evenly distributed over the face 10A of the module 10, while being offset internally relative to the longitudinal peripheral edges 18 and transverse edges 19 of the module. More precisely, if the face 10A of the module is divided into four quadrants of the same dimensions, the fasteners 20 are each positioned in a central portion of one of the quadrants. Such an arrangement of the fasteners 20 distributed over the face 10A makes it possible to reinforce the structure of the module 10 and improve its mechanical strength.

As can be clearly seen in FIG. 4, each support 40 comprises a first portion 42 for snap-fitting onto the structure 30 and a second portion 44 for coupling to a fastener 20. In this embodiment, the snap-fitting portion 42 is generally U-shaped, in which the opening of the U is partially closed by a rim 43. One of the side branches of the U-shaped snap-fitting portion 42 is formed by the coupling portion 44 while the other side branch 41 of the U-shaped snap-fitting portion 42 is extended by the rim 43, curved in the direction of the coupling portion 44. Therefore, the snap-fitting portion 42 has a quadrilateral cross section, open between the rim 43 and the portion 44, which matches the cross section of each cross member 37.

Each support 40 of the attachment device 1 is made of an elastically deformable material, so that the side branches 41 and 44 of the snap-fitting portion 42 are capable of being parted elastically from one another. It is therefore possible to enlarge the opening delimited between the rim 43 and the coupling portion 44, in order to snap-fit the portion 42 onto a cross member 37 of the structure 30. According to a preferred embodiment of the invention, each support 40 is made of an electrically insulating material, particularly a polymer material or with a polymer matrix, such as polypropylene, preferably fibre-reinforced, particularly with glass fibres.

In the snap-fitted configuration of the portion 42 onto a cross member 37, the cross member 37 is received and tightly fitted into the internal volume 47 defined by the portion 42, so that the support 40 is secured to the cross member 37. In this snap-fitted configuration, it is possible to provide a slack adjustment, that is to say with a certain clearance, of the portion 42 on the cross member 37, the support 40 then being capable of being moved by sliding in the direction of the longitudinal axis $X_{37}$ of the cross member.

As shown in FIG. 4, the coupling portion 44 which, in this embodiment, forms a side branch of the snap-fitting portion 42 of each support 40, comprises a protruding profile 45. This protruding profile 45 is designed to engage with a matching recessed profile 25 which each fastener 20 of the attachment device 1 comprises. More precisely, each fastener 20 has the shape of a parallelepipedal plate with a thickness $e_{20}$, one face 20A of which comprises the recessed profile 25. Advantageously, each fastener 20 of the attachment device 1 is made of an electrically insulating material, particularly a polymer or with a polymer matrix, such as polypropylene, optionally reinforced by fibres, such as glass fibres. If the fasteners 20 and the supports 40 of the attachment device 1 according to the invention are made of a polymer material or with a polymer matrix, each fastener 20 and each support 40 is advantageously formed by moulding, particularly by injection moulding, or by any other appropriate method.

The recessed profile 25 of each fastener 20 and the protruding profile 45 of each support 40 have matching trapezoidal sections, the cross section $S_{25}$, $S_{45}$ of each profile 25, 45 reducing in a longitudinal direction $X_{25}$, $X_{45}$ of the profile.

The profiles 25 and 45 of a fastener and of a support 40 of the device 1 are therefore capable of coming into mutual engagement by a sliding movement of one relative to the other in the longitudinal direction $X_{25}$, $X_{45}$ of the profiles, as shown by the arrow $F_1$ of FIG. 2. When the profile 25 of a fastener 20 is engaged with the profile 45 of a support 40, the fastener and the support are coupled to one another. This coupling of the fastener 20 and of the support 40 is reversible, to the extent that, when the profiles 25 and 45 are in mutual engagement, there remains a degree of freedom for the fastener 20 to move relative to the support 40 in the direction of the arrow $F_2$ of FIG. 2 opposite to the arrow $F_1$. In other words, when the profiles 25 and 45 are in mutual engagement, the fastener 20 and the support 40 are immobilized relative to one another except in the direction of the arrow $F_2$.

As can be seen in FIG. 3, each fastener 20 is attached to the face 10A of the module 10 so that the axis $X_{25}$ of its recessed profile 25 is parallel to the longitudinal axis $X_{10}$ of the module. Advantageously, the thickness $e_{20}$ of each fastener 20 of the device 1 is equal to the thickness $e_{50}$ of each of the two connection boxes 50 of the module 10. Therefore, the module 10 furnished with its two connection boxes 50 and its four fasteners 20 has an optimal compactness, which makes it easier to package, store and transport.

The four supports 40 for receiving a module 10 are distributed in pairs on two adjacent cross members 37, one of these cross members, called the upper cross member, being placed above the other, called the lower cross member, because of the angle of inclination a of the attachment plane π of the modules on the structure 30. In the snap-fitted configuration of each of the supports 40 on a cross member 37, the axis $X_{45}$ of the protruding profile 45 of the support is oriented transversely relative to the axis $X_{37}$ of the cross member. Therefore, when the four fasteners 20 of the module are engaged with four matching supports 40, the module 10 is attached to the structure 30 with its longitudinal axis $X_{10}$ oriented transversely relative to the axis $X_{37}$ of the cross members 37.

A method for mounting photovoltaic modules 10 onto the structure 30, for which the module-attachment mid-plane π is inclined relative to the horizontal at the angle α of between 0° and 90°, preferably between 10° and 90°, by means of the attachment device 1 according to the invention, comprises steps as described below.

First of all, four fasteners 20 are attached to each module 10, according to the arrangement shown in FIG. 5, by bonding between the face 20B of each fastener, (the face opposite to the face 20A), and the face 10A of the module.

Supports 40 are also secured to the structure 30 by snap-fitting the portion 42 of each support onto the cross members 37 of the structure. More precisely, for each module 10, four supports 40 are snap-fitted onto two adjacent cross members 37, upper and lower due to the angle of inclination α of the plane π, namely two supports on the upper cross member 37 and two supports on the lower cross member 37, by placing the supports on the cross members with an appropriate spacing corresponding to the spacing between the fasteners 20 of the modules 10. Each support 40 is snap-fitted onto the corresponding cross member 37 so that the cross section $S_{45}$ of its profile 45 diminishes in the direction of the ground.

If the snap-fitting portion 42 of each support 40 is mounted slackly or with a certain clearance on the corresponding cross member 37 in the snap-fitted configuration, that is to say with the possibility of sliding the support 40 relative to the cross member 37, it is possible to adjust the positioning of the supports 40 on the structure 30, prior to mounting the modules 10 or during mounting. This positioning is then immobilized by bonding the supports 40 to the structure 30, by means of an adhesive material which fills in the clearance between the portion 42 and the cross member 37.

Once the modules are furnished with their fasteners 20 and the structure is fitted with supports 40, each module 10 is attached to the structure 30 by placing the profiles 25 of the four fasteners 20 of the module in engagement with the profiles 45 of the four supports 40 snap-fitted onto the structure 30 for this purpose. This mutual engagement of the profiles 25 and 45 is obtained by a downwards sliding movement, in the direction of the arrow $F_1$ in FIG. 2, in the direction of the ground, of the module 10 relative to the structure 30.

Advantageously, the step of securing the fasteners 20 to the face 10A of each module is carried out on the site for manufacturing the modules 10, in a manner incorporated onto the module manufacturing line, while the subsequent steps are carried out on the site for mounting the modules 10.

If it is necessary to remove or replace a module 10 that is mounted on the structure 30, for example in the event of a failure of this module, the removal of the module 10 is carried out in a particularly simple manner, by an upwards sliding movement, in the direction of the arrow $F_2$ in FIG. 2, of the module 10 relative to the structure 30.

In the second embodiment shown in FIGS. 7 and 8, the elements that are similar to those of the first embodiment bear identical reference numbers. The attachment device 1 according to this second embodiment differs from the attachment device of the first embodiment only in the structure of the supports 40. More precisely, in this second embodiment, the snap-fitting portion 42 and the coupling portion 44 of each support 40 are at a distance from one another and connected to one another by a junction portion 46. In other words, the coupling portion 44 no longer forms a side branch of the snap-fitting portion 42, but is connected to a side branch 48 of the portion 42 by the junction portion 46. The supports 40 associated with each module 10 are chosen so that the distance between the portions 42 and 44 is different between the first pair of supports of the module, snap-fitted onto the upper cross member 37 of the structure 30, and the second pair of supports of the module, snap-fitted onto the lower cross member 37.

As above, each support 40 is advantageously injection-moulded in a single piece in a polymer material, such as polypropylene, this polymer material preferably being reinforced with fibres, particularly glass fibres. The structure of each support 40, shown in FIGS. 7 and 8, is very schematic. Particularly, reinforcing elements on the junction portion 46, which are necessary for providing satisfactory mechanical strength for the support 40, have not been shown in these figures.

As shown in FIG. 7, the distance $d_1$ between the portions 42 and 44 of the first pair of supports 40, snap-fitted onto the upper cross member 37, is less than the distance $d_2$ between the portions 42 and 44 of the second pair of supports 40, snap-fitted onto the lower cross member 37, so that, in the configuration in which each module is attached to the structure, the module is inclined at an angle $\beta$ of the order of 10° relative to the plane $\pi$ for attaching modules to the structure. The result of this is a stepped arrangement of the modules 10 on the structure 30, like tiles. Such a stepped arrangement of the modules 10 prevents dirt or else snow from standing between two adjacent modules and thus limits the clogging of the modules.

The supports 40 of the attachment device 1 according to this second embodiment may be manufactured in two distinct runs, one having the spacing $d_1$ between the portions 42 and 44 and the other having the spacing $d_2$ between the portions 42 and 44. As a variant, the supports 40 may be manufactured according to a single template comprising means for modulating the distance between the portions 42 and 44, for example a notch-based system. In this case, specific reinforcements of the joining zone between the portions 42 and 44 should be provided, in order to maintain a satisfactory mechanical strength of the support.

As emerges from the two embodiments described above, an attachment device according to the invention allows rapid and easy mounting of solar modules on a structure, such as a mounting structure of a ground-mounted system, by mutual engagement of the profiles of the fasteners and the supports of the attachment device, without requiring particular tools. This engagement operates via a simple relative sliding movement of each module relative to the structure, until immobilization which results from the flared shape, in particular the trapezoidal shape, of each profile.

It is easy to position the modules on the structure, by adjusting the position of the snap-fitted supports on the mounting structure. In addition, the attachment achieved of the modules on the structure is reliable and robust. In particular, the weight-resistance of the modules is satisfactory by virtue of the even distribution of the fasteners on the rear face of each module. Moreover, the assembly of the modules on the structure obtained according to the invention is reversible, which allows individual removal of a module from the structure, if this module should fail.

In a particularly advantageous manner, an attachment device according to the invention allows the mounting of modules on any type of structure, by virtue of the possible adaptation of the shape of the snap-fitting portion for the supports, while the shape of the portion for coupling the supports and the fasteners, that is to say the shape of their profiles in relief, remains unchanged. In addition, when a space is provided between the snap-fitting portion and the coupling portion of each support of the attachment device, as is the case in the second embodiment, the movements of air convection behind the modules, and therefore the cooling of the modules, are improved.

The elements constituting an attachment device according to the invention, namely the fasteners and the supports, have the advantage of being able to be manufactured in a simple and economic manner, particularly by injection of a polymer material. The device according to the invention, when it uses, for the attachment of the modules, only elements made of an electrically insulating material, particularly a polymer material or with a polymer matrix, also makes it possible to dispense with the necessity to earth the modules, while preventing the risk of damage to the modules at high voltage, in particular by delamination. Fasteners and supports made of polymer material are also capable of absorbing, by elastic deformation, vibration movements of the modules relative to their mounting structure, vibrations that are likely to occur for example under the effect of the wind. The result of this is a damping of the noises associated with such vibration movements.

Finally, thanks to the installation of an attachment device according to the invention, it is no longer necessary to have a frame around the periphery of the module in order to attach it to a structure. Therefore the whole active surface of the module is exposed to solar radiation, which ensures optimal efficiency of the module.

The invention is not limited to the examples described and shown. In particular, an attachment device according to the invention may use fasteners and supports having forms and methods of distribution, on the modules and on the receiving structure, that differ from those described above, or else a different number of fasteners and supports. These parameters may in particular be adapted according to the expected loading on the modules, once they are attached to the structure, for example a wind or snow loading. As mentioned above, the fasteners are advantageously distributed evenly over the rear face 10A of the module, so as to reinforce the structure of the module. Therefore, if each module has to withstand a particularly high loading, it is for example possible to provide, in addition to the fasteners distributed in each quadrant of the face 10A of the module as shown in FIG. 5, a fifth fastener placed centrally relative to the module and to connect the upper and lower cross members receiving the supports with a central beam onto which a fifth support, designed to interact with the fifth fastener, can be snap-fitted.

Similarly, the profiles in relief, that is to say protruding or recessed, of the fasteners and of the supports of an attachment device according to the invention may be different from those described above, particularly in terms of shape and of size. In particular, it is possible to provide protruding profiles on the fasteners and recessed profiles on the supports, the converse to the examples shown in the figures. The profiles may also have a shape other than a trapezoidal shape, while preferably retaining a variation in the cross section of each profile in the longitudinal direction of the profile in order to achieve a lock between the profile of a fastener and the profile of a support when they are mutually engaged.

The materials forming the fasteners and supports of an attachment device according to the invention may be different from those described above. Notably, if it is of particular advantage, for the purpose of preventing any damage to the modules at high voltage, to have fasteners made of an electrically insulating material such as a polymer material or with a polymer matrix, the supports may, for their part, be made of any material having properties of elastic deformability suitable for their snap-fitting function. In particular, the supports may be made of a metal material, but in this case the thickness $e_{20}$ of the fasteners made of electrically insulating material is preferably greater than 10 mm, still more preferably greater than 15 mm, in order to ensure a sufficient distance between the modules and the metal supports, the latter, because of their electrical conductivity, being likely to induce damage to the modules at high voltage if they are too close to the modules.

Figure 9:
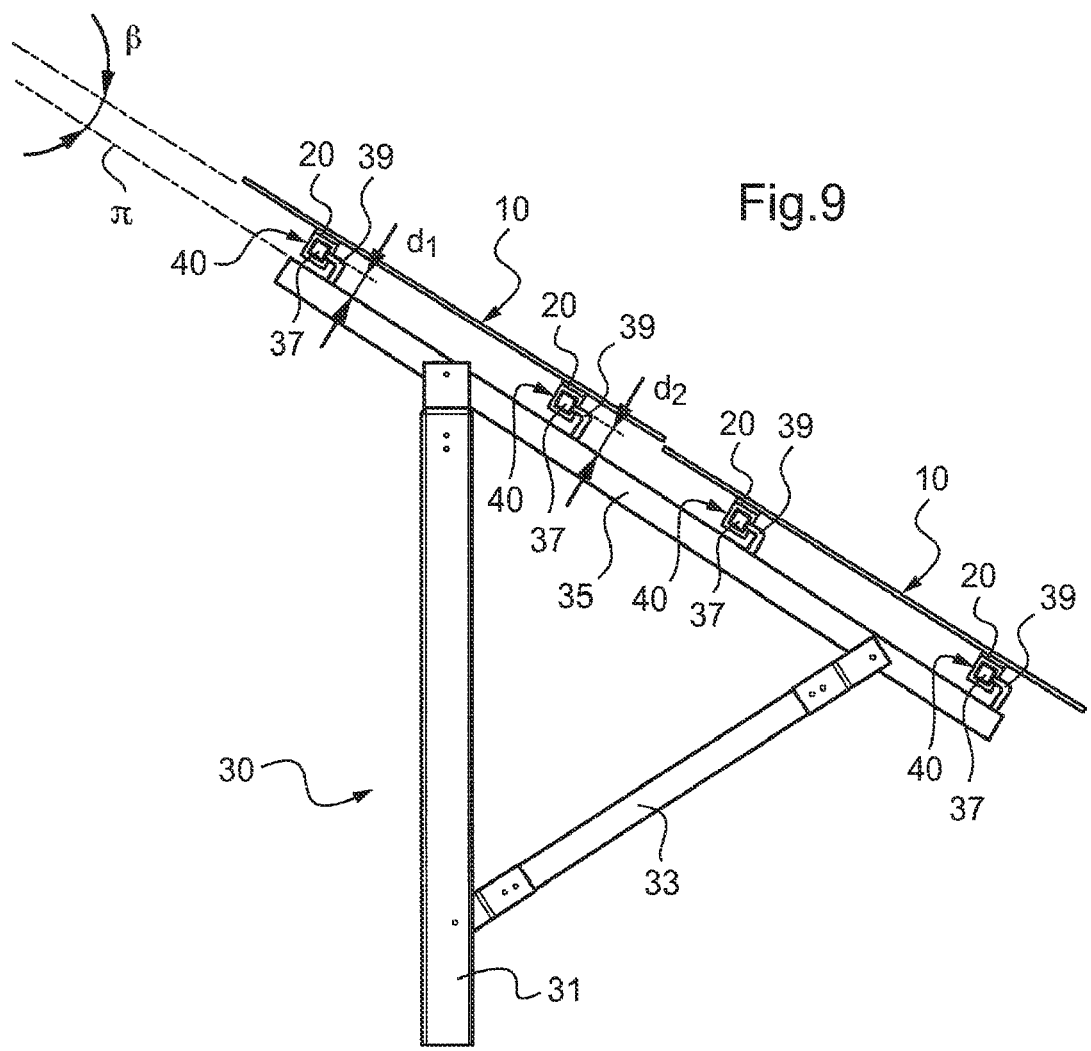
FIG. 9 is a view similar to FIG. 7 of photovoltaic solar modules mounted, by means of attachment devices according to the first embodiment of the invention, on a carrying structure that differs from the carrying structures shown in FIGS. 1 and 7.

Moreover, a stepped arrangement, like tiles, of the modules on the structure, which is an advantageous arrangement in order to limit the dirtying of the modules, may be obtained by other methods than an adaptation of the structure of the supports of the attachment device according to the invention, as illustrated in the second embodiment, in which a different distance between the snap-fitting and coupling portions is provided from one support to the other. Notably, such a stepped arrangement of the modules may be obtained by modifying the structure of the fasteners or else the receiving structure of the modules, rather than the structure of the supports. The modification of the receiving structure for the purpose of obtaining a stepped arrangement of the modules is illustrated in FIG. 9. In this figure, the attachment device is that of the first embodiment, but the cross members 37, instead of being fitted directly to the joints 35 of the structure 30, are attached to rods 39 protruding from the joints 35. More precisely, as shown in FIG. 9, for each module 10 to be attached to the structure 30, the upper cross member 37 for receiving the module is attached to the protruding rods 39 having a length $d_1$, while the lower cross member 37 for receiving the module is attached to protruding rods 39 having a length $d_2$ greater than $d_1$. Therefore, in the configuration in which the supports 40 are snap-fitted to the cross members 37, themselves attached to the protruding rods 39, and in which the fasteners 20 are coupled to the supports 40, each module is inclined at an angle β of the order of 10° relative to the plane π.

Finally, an attachment device according to the invention may be used for the mounting, on a structure, of modules which may or may not be fitted with peripheral frames, the frameless option however being preferred. An attachment device according to the invention may also be used for the mounting of solar modules of any type on a receiving structure also of any type. In particular, the photovoltaic solar modules described above may be replaced by thermal or mixed photovoltaic/thermal solar modules. Moreover, the receiving structure may without distinction be a mounting structure of a ground-mounted system, a roof or a façade, the shape of the snap-fitting portion of the supports of the attachment device according to the invention being easily adaptable for allowing snap-fitting on any type of receiving structure.

The invention claimed is:

1. An attachment device for attaching a module for collecting energy originating from solar radiation on a structure, in which the module is provided with at least one fastener on its face designed to be facing the structure, the device comprising at least one support secured to the structure, the fastener and the support being suitable for being coupled to one another for the attachment of the module to the structure, wherein the support is secured to the structure by snap-fitting and wherein the support comprises a first snap-fitting portion for snap-fitting onto the structure, the snap-fitting portion defining an internal volume for receiving a portion of the structure, the snap-fitting portion being elastically deformable and suitable for gripping the portion of the structure in its internal volume, and wherein the support comprises a second portion for coupling relative to the fastener, the first snap-fitting portion and the second portion being at a distance from one another.

2. The attachment device according to claim 1 wherein the fastener comprises a profile, as a protrusion or as a recess, suitable for engaging with a matching profile, as a recess or as a protrusion, of the support, the fastener and the support being capable of being coupled to one another by engaging their respective profiles.

3. The attachment device according to claim 2, wherein the profiles of the fastener and of the support each have a cross section which diminishes in one direction of the profile, the profiles of the fastener and of the support being capable of coming into mutual engagement by a sliding movement of one to the other in said direction of the profile.

4. The attachment device according to claim 1, comprising at least two fasteners secured to said face of the module and two supports secured to the structure, the distance between the first portion and second portion of one of the supports being different from the distance between the first portion and second portion of the other support so that, in the configuration in which the module is attached to the structure, the module is inclined at an angle in a mid-plane of attachment of modules to the structure.

5. The attachment device according to claim 1, wherein the fastener is made of an electrically insulating material.

6. The attachment device according to claim 1, wherein the support is made of an electrically insulating material.

7. The attachment device according to claim 1, comprising at least two fasteners secured to said face of the module by being evenly distributed over said face of the module and offset internally relative to the peripheral edges of the module.

8. The attachment device according to claim 1, wherein the module is a photovoltaic module with no frame, which comprises a front substrate, a rear substrate and at least one photovoltaic cell inserted between the front substrate and rear substrate, the or each fastener being secured to a face of the rear substrate, the face being opposite to the photovoltaic cell.

9. A mounting method for mounting at least one module for collecting energy originating from solar radiation on a structure using an attachment device according to claim 1, the method comprising:
- securing at least one fastener to the face of the module, the face being designed to be facing the structure;
- snap-fitting at least one support to the structure;
- attaching the module to the structure by coupling the fastener to the support.

10. A mounting method for mounting at least one module for collecting energy originating from solar radiation on a structure for which a mid-plane for attachment of modules is inclined at an angle relative to the horizontal, using an attachment device according to claim 3, the method comprising:
- securing at least one fastener to the face of the module, the face being designed to be facing the structure;
- snap-fitting at least one support to the structure, so that the cross section of its profile diminishes in the direction of the ground;
- attaching the module to the structure by placing the profiles of the fastener and of the support in mutual engagement by a sliding movement downwards, in the direction of the ground, of the fastener relative to the support.

11. The mounting method according to claim 9, further comprising:
- attaching at least a first and a second fastener to the face of the module, the face being designed to be facing the structure;
- snap-fitting at least one first and one second support to the structure;
- positioning the first fastener facing the first support and adjusting the position, on the structure, of the second support in order to place it facing the second fastener;
- attaching the module to the structure by coupling the first and the second fastener respectively to the first and second support.

12. The mounting method according to claim 10, further comprising:
- attaching at least a first and a second fastener to the face of the module, the face being designed to be facing the structure;
- snap-fitting at least one first and one second support to the structure;
- positioning the first fastener facing the first support and adjusting the position, on the structure, of the second support in order to place it facing the second fastener;
- attaching the module to the structure by coupling the first and the second fastener respectively to the first and second support.

13. The attachment device according to claim 1, wherein said support is formed in a single piece.

14. The attachment device according to claim 13, wherein said single piece is formed by injection moulding.

15. The attachment device according to claim 1, wherein said support comprises a first U-shaped part, forming said first snap-fitting portion, and a second U-shaped part, said first and second U-shaped parts extending longitudinally along a similar direction.

16. The attachment device according to claim 15, wherein said first and second U-shaped parts are adjacent to each other so as to share a common side branch that is elastically deformable and suitable for gripping the portion of the structure.

17. The attachment device according to claim 15, wherein said distance is formed at least by a spacing defined between two lateral side branches of said second U-shaped part.

18. The attachment device according to claim 1, wherein said support includes a base, and a first, a second and a third lateral branch each extending away from said base toward a similar direction, said first and second lateral branches defining said first snap-fitting portion, and wherein said second portion is formed on said third lateral branch.

* * * * *